United States Patent [19]

Bryant et al.

[11] Patent Number: 5,030,259
[45] Date of Patent: Jul. 9, 1991

[54] PORTABLE VACUUM CLEANING SYSTEM

[75] Inventors: Earl R. Bryant; Jerry W. Richards, both of Birmingham; James N. Carnathan, Heuytown; William M. Franklin, Birmingham; Earnest N. Hutcheson, Birmingham; Elie A. Boukhier, Birmingham, all of Ala.

[73] Assignee: Guzzler Manufacturing, Inc., Birmingham, Ala.

[21] Appl. No.: 452,118

[22] Filed: Dec. 18, 1989

[51] Int. Cl.$^5$ .......................... A47L 5/00; B01D 50/00
[52] U.S. Cl. ...................... 55/302; 15/340.1; 55/341.1; 55/343; 55/345; 55/356; 55/432; 55/459.1
[58] Field of Search ............ 15/340.1; 55/276, 283, 55/302, 341.1, 342, 343, 345, 356, 432, 458, 459.1

[56] References Cited

U.S. PATENT DOCUMENTS

| | | | |
|---|---|---|---|
| 3,842,461 | 10/1974 | Wurster | 55/342 |
| 3,870,489 | 3/1975 | Shaddock | 55/345 |
| 4,017,281 | 4/1977 | Johnstone | 15/340.1 |
| 4,121,915 | 10/1978 | Anderson | 55/356 |
| 4,218,226 | 8/1980 | Boozer | 55/356 |
| 4,227,893 | 10/1980 | Shaddock | 15/340.1 |
| 4,509,963 | 4/1985 | Jackson | 55/356 |
| 4,574,420 | 3/1986 | Dupre | 55/345 |
| 4,578,840 | 4/1986 | Pausch | 55/356 |
| 4,723,969 | 2/1988 | DeMarco | 55/302 |
| 4,935,984 | 6/1990 | Bryant et al. | 15/340.1 |

FOREIGN PATENT DOCUMENTS

| | | | |
|---|---|---|---|
| 1241509 | 9/1988 | Canada | 15/340.1 |
| 2728712 | 1/1979 | Fed. Rep. of Germany | 55/302 |

OTHER PUBLICATIONS

"We Clean Air" Bulletin 311 from R. A. Packaged Dust Collector, American Precision Industries, Dec. 1968.

Primary Examiner—Jay H. Woo
Assistant Examiner—C. Scott Bushey
Attorney, Agent, or Firm—Thomas, Kerr & Kayden

[57] ABSTRACT

A vehicle mounted vacuum cleaning system (20) includes a portable frame (23), a cyclone separator (51) mounted to the frame and a blower (111) for urging in the airstream to pass through the cyclone separator. Movable support arms (53, 54) are provided for supporting the cyclone separator and for moving it between a first position adjacent the portable frame and a second position extended laterally from the portable frame. Lifting track (141) and rail (142) are provided for moving the cyclone separator between raised and lowered positions. The vacuum cleaning system further includes a plurality of filter bags (76) mounted within a filter bag house (75) and air purge grids (81 and 82) for cleaning all of the filter bags simultaneously. The air purge system includes a reservoir (93) for storing compressed air and valve means (96) for releasing a charge of compressed air into the filter bags in a direction generally opposite to the normal direction of airflow through the filter bags in response to the attainment of a selected pressure within the reservoir.

33 Claims, 6 Drawing Sheets

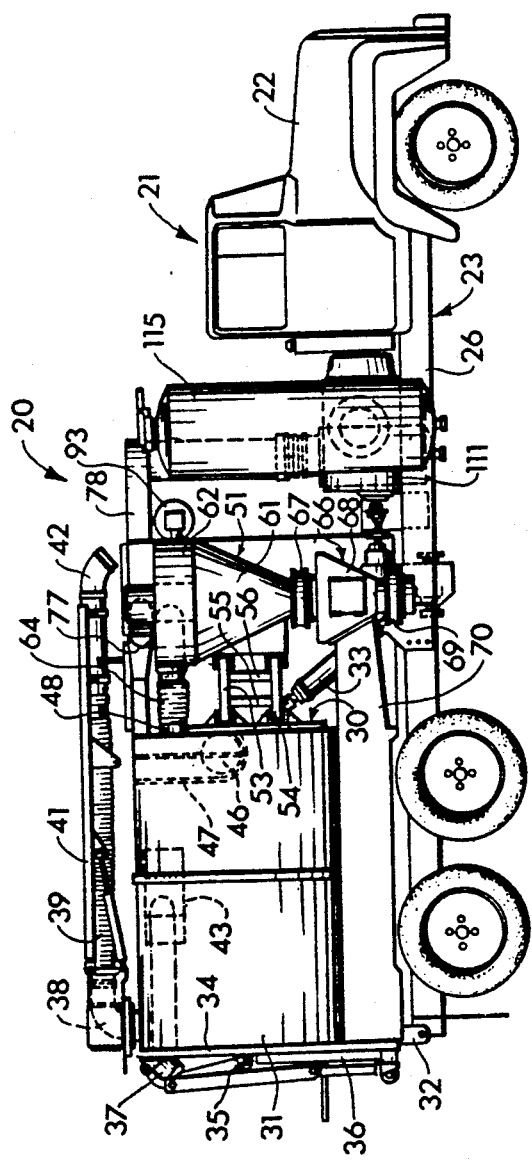
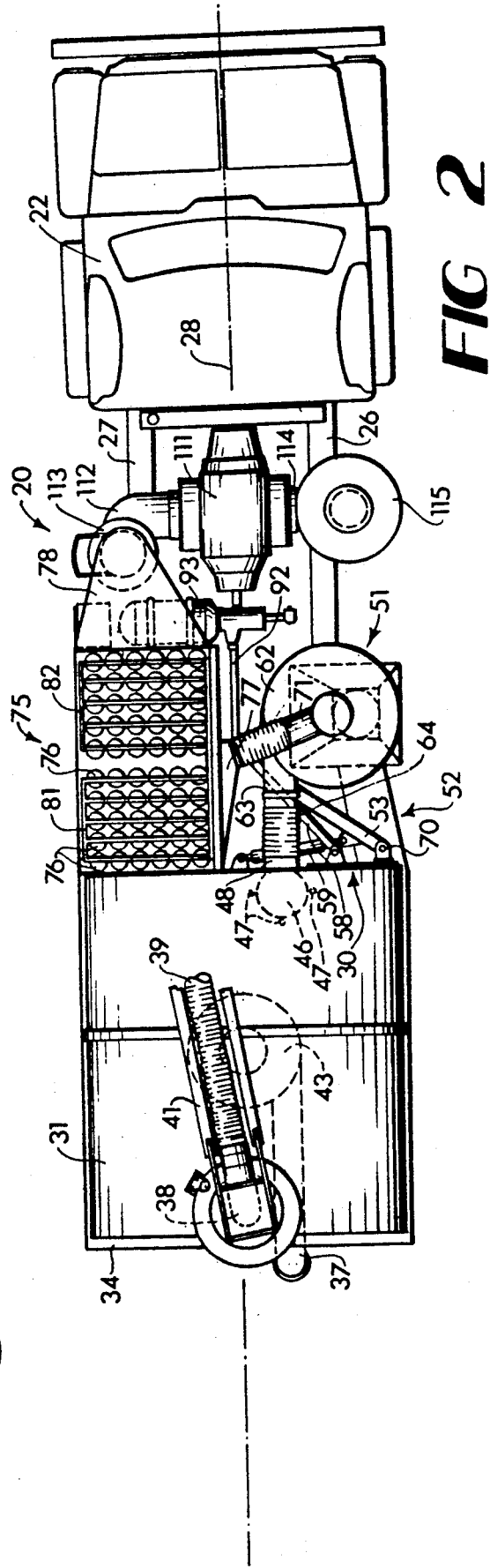

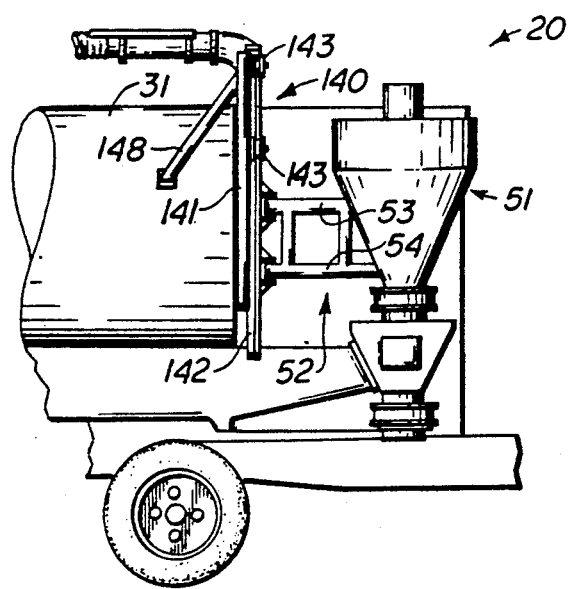
FIG 10
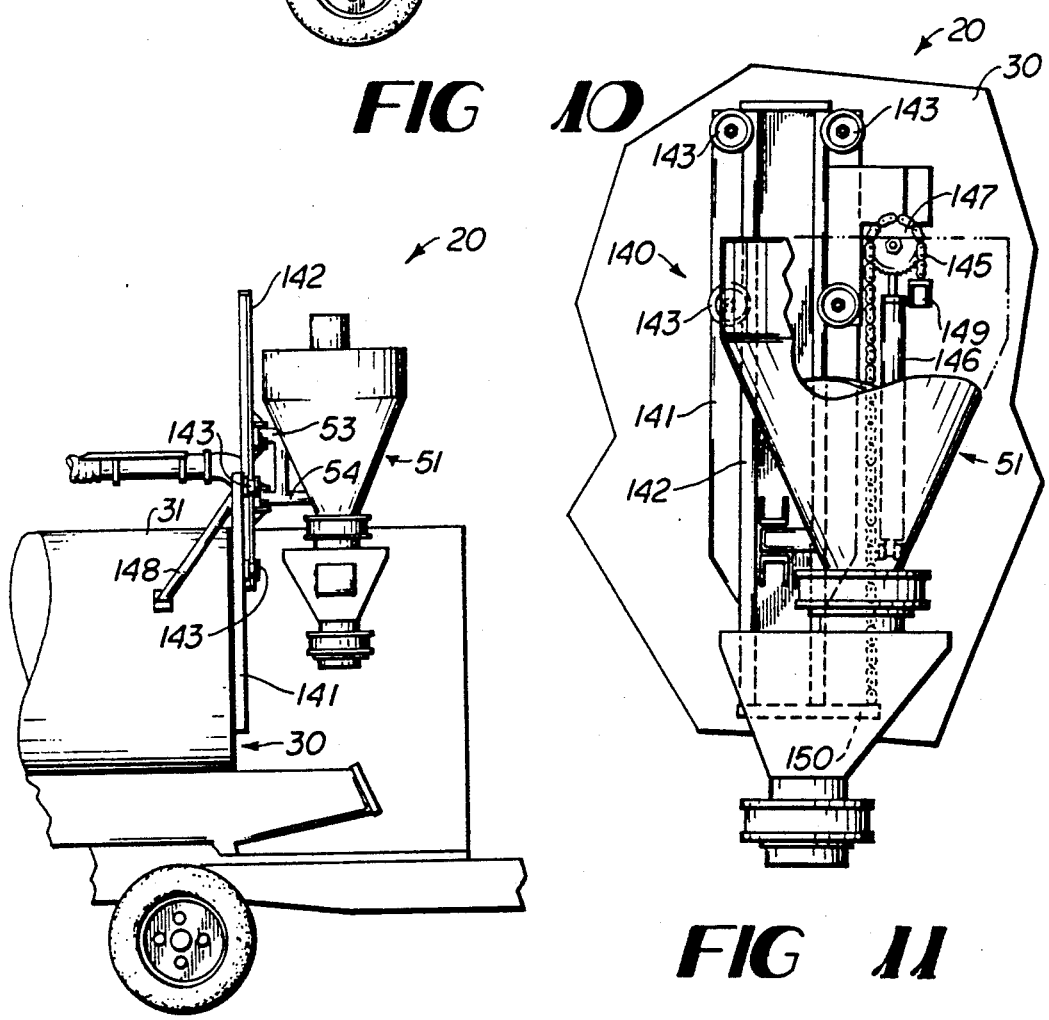
FIG 12
FIG 11

PORTABLE VACUUM CLEANING SYSTEM

TECHNICAL FIELD

This invention relates to vehicle-mounted portable industrial vacuum cleaning systems of the type which are driven to a waste pick-up site and which collect debris, such as particulate matter, by generating a vacuum stream that induces the debris to flow into collection chambers carried by the vehicle. The vehicle can be driven to a dump site for discharging its load or the vehicle can discharge its load to a container at the collection site.

BACKGROUND OF THE INVENTION

It has been common in the past to use truck-mounted or trailer-mounted vacuum cleaning systems to clean up a wide variety of debris such as from sewers, sludge basins and waste collection areas of mills and other industrial sites. Typically, such vacuum cleaning systems have one or more tanks or collection chambers on the vehicle into which the material is deposited. A high velocity blower generates a stream of air to flow through a flexible hose that induces the waste material or debris to flow from the waste site through the flexible hose to a large collection chamber where the heavier debris is collected. The debris remaining in the air stream moves with the air stream through one or more collection chambers that collect the lighter particles of debris. Ideally, the air exhausted from the blower to the atmosphere is so clean that no contaminants are discharged to the atmosphere. When these tanks or containers become loaded with the waste material, it can be time consuming and expensive to remove the material from them and to properly off-load the material into other collection containers or into collection areas.

Various efforts have been made in the past to address this problem of removing collected debris from the vacuum cleaning system. For example, it has been common to provide truck mounted vacuum cleaning systems having a storage tank which may be raised or tilted, in the manner of a dump truck, to dump the material from the collection tank into a secondary transport vehicle or into a dump or storage site. Examples of prior art portable vacuum cleaning systems with tiltable dump features are disclosed in U.S. Pat. Nos. 4,218,226, 4,227,893 and 4,578,840.

Other arrangements provide a collection tank on the vehicle which may be raised up to allow a secondary vehicle to be positioned under the collection tank and to allow the waste material then to be transferred from the collection tank by gravity to the secondary vehicle for final transport. Examples of this type structure are disclosed in U.S. Pat. Nos. 4,121,915 and 4,574,420. These arrangements generally provide a vertical, planar range of movement of the collection tank and are illsuited for discharging the collected material outside of that vertical plane. Furthermore, these types of arrangements generally provide movement for a primary collection tank. If the tank is large, it is effective for hauling the material to a remote site, but because of the added bulk may require a costly or bulky lifting frame. On the other hand, if the liftable primary tank is small, it is easily lifted but the reduced capacity may render it inefficient for transporting material to a remote dump site.

Many collection systems include filter bags for filtering out the material from the airstream induced by the vacuum system. These filter bags become clogged quickly and must be cleaned frequently. If the operation of the blower must be terminated for cleaning of the filter bags, the effective usefulness of the system is limited. Prior art solutions to this problem generally provide an air purge system for periodically delivering a charge of compressed air to the filter bags in a direction opposite to the normal flow of air through the filter bags caused by the vacuum system without terminating the operation of the blower. In a typical prior art air purge system, there are a large number of filter bags and there are a number of air purge circuits for cleaning several of the bags at one time, with the circuits being controlled by solenoids and timer valves so that the air charge is introduced into one group of filter bags and then into another group of filter bags and then into a third group of filter bags, and so on in sequence. This sequential "stepping through" the filter bags has the disadvantage of requiring a multiplicity of control circuits including solenoid valves and control timers. This added complexity often leads to diminished reliability and is expensive in its implementation.

Accordingly, it has been determined that a need exists for a portable vacuum cleaning system which is of simple construction and yet which is self-cleaning, versatile and reliable and which provides improved access for discharging the collected material into small containers, such as 55-gallon drums and pickup truck beds as well as into large containers or dumps.

SUMMARY OF THE INVENTION

Briefly described, the present invention comprises a vehicle mounted vacuum cleaning system which includes a large collection chamber tiltably mounted to the frame of the vehicle so that it can dump its load, a smaller cyclone separator which can swing out from the vehicle to discharge its load by gravity, a bag house that includes a plurality of filter bags for collecting the fine particles, a HEPA filter for collecting the microscopic particles, and a high velocity vacuum blower for inducing a stream of air and debris to flow in sequence through the chambers of the system. The cyclone separator has an airstream inlet, an airstream outlet and a separate lower chamber in which waste material is collected.

Movable support means are provided for supporting the cyclone separator and for moving it between a first position adjacent the frame of the vehicle where the cyclone separator operates in series with the large collection chamber and in series with the bag house, and a second position extended laterally from the frame of the vehicle where the cyclone separator can operate independently of the large collection chamber. The lower collection chamber of the cyclone separator further has a valve discharge structure mounted to its lower portion for cyclically releasing accumulated debris from the cyclone separator as the cyclone separator continuously operates. Preferably, means are provided for lifting the cyclone separator together with its movable support means between raised and lowered positions. The lifting means can lift and lower the cyclone separator with the cyclone separator in either its position adjacent the vehicle frame or its position extended laterally from the vehicle frame. So constructed, the cyclone separator may be extended laterally from the vehicle frame and lifted for easy discharge of accumulated particles from the cyclone separator, such as into 55 gallon drums.

The illustrative embodiment further comprises a filter bag house which comprises a plurality of filter bags mounted therein, with the filter bag house having an airstream inlet and an airstream outlet to direct the airborne debris from the inlet through the filter bags and out of the outlet. An air purge system is provided for cleaning all of the filter bags simultaneously, with the air purge system being adapted to direct a charge of compressed air into the filter bags in a direction generally opposite to the normal direction of air flow through the bag house. A reservoir for temporarily storing compressed air provides a sufficient volume of compressed air to allow all of the filter bags to be cleaned simultaneously.

It is, therefore, an object of the present invention to provide a large capacity portable vacuum cleaning system which can be filled to maximum capacity and transported to a dump site for off-loading its load or which can discharge a smaller load of collected material to small containers, such as 55-gallon drums as well as to large containers and dumps.

It is another object of the invention to provide a means for automatically cleaning the filter bags of a vacuum cleaning system while avoiding the use of a large number of solenoids, valves, circuits and other more complex and expensive apparatus.

Yet another object of the invention is to provide a means for cleaning the filter bags which is both more reliable and more effective than prior art means.

Another object of the invention is to provide a vehiclemounted vacuum cleaning system that includes a cyclone separator which is selectively connectable in series with a larger collection chamber for removing debris from the air stream drawn from the larger collection chamber or can be used separately from the larger collection chamber for collecting smaller loads and smaller particles of debris and can simultaneously discharge its collected debris to another container at the collection site.

Another object of this invention is to provide a versatile and efficient portable vacuum collector system that is reliable and is easy to operate.

Other objects, advantages and features of the invention will become apparent upon reading the following specification in conjunction with the accompanying drawing figures.

BRIEF DESCRIPTION OF THE DRAWINGS

FIG. 1 is a side elevation view of a truck-mounted portable vacuum cleaning system according to the present invention in a preferred form including a movable cyclone separator and a bag house air purge system.

FIG. 2 is a plan view of the portable vacuum cleaning system of FIG. 1.

FIG. 10 is a side elevation view of a truck-mounted portable vacuum cleaning system according to the present invention in a second preferred form, including a cyclone separator and means for elevating the cyclone separator.

FIG. 11 is a front elevation view of a portion of the portable vacuum cleaning system of FIG. 10.

FIG. 12 is a side elevation view of the portable vacuum cleaning system of FIG. 10, with the cyclone separator shown in an elevated position.

DETAILED DESCRIPTION

Figure 3:
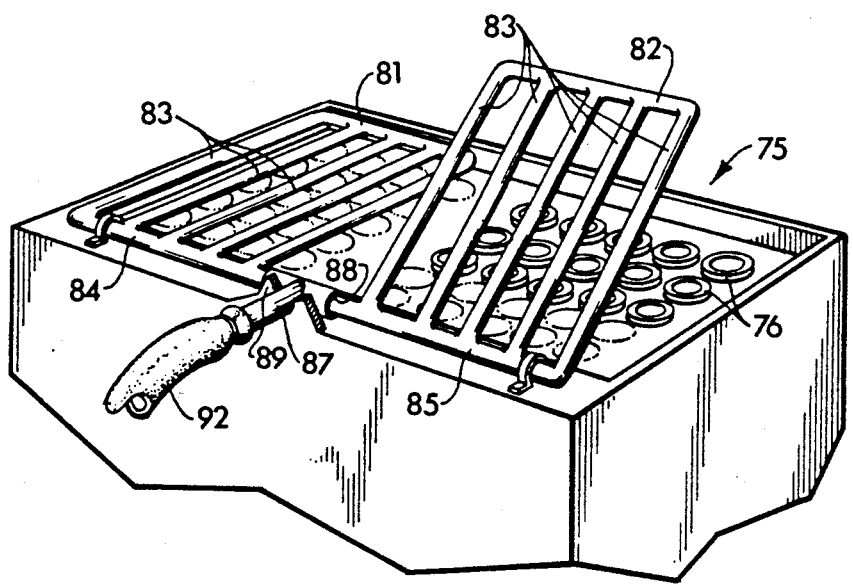
FIG. 3 is a perspective illustration of a portion of the bag house air purge system of the portable vacuum cleaning system of FIG. 1, with some elements removed for clarity of illustration.

With reference in more detail to the drawings, in which like numerals represent like parts throughout the several views, FIGS. 1 and 2 show a truck mounted portable vacuum cleaning system 20 according to the present invention in a first preferred form. A truck 21 has a cab 22 and a chassis or frame 23. The frame 23 includes a pair of rigid elongated frame members 26 and 27 which extend along a longitudinal axis 28. In the particular embodiment illustrated in the figures, the portable vacuum cleaning system is illustrated as mounted on the truck 21, but it is to be understood that the system could also be mounted, for example, to a towable trailer.

The portable vacuum cleaning system 20 includes a large cylindrical collection tank or chamber 31 pivotally mounted to the frame 23 by means of a pivot 32 and a hydraulic cylinder 33. The hydraulic cylinder 33 is pivotally mounted at one of its ends to a forward portion or bulkhead 30 of the collection tank 31 and is pivotally mounted at the other end to the truck frame 23. The collection tank 31 also includes an upper rear wall 34 and a lower movable rear cover or door 36 mounted to a rear portion thereof which is hingedly connected at its upper edge by hinge 35 to the rear upper wall 34 of the tank 31. The collection tank 31 includes rear inlet port 37 in the upper portion of rear wall 34 and a top inlet port 38 opening through the upper part of the cylindrical tank wall. A boom assembly 41 is in communication with a boom inlet port 42. The boom 41 is movably mounted to the top of the cylindrical collection tank 31 and supports a flexible collection conduit or hose 39. Collection conduit 39 is connected at one of its ends to inlet port 38. This permits the free end of the collection conduit 39 to be moved through a wide range of elevations and angular positions.

A centrifugal cyclonic ring particle separator 43 shown in dash outline (FIGS. 1 and 2) is mounted internally of the collection tank 31 and is in fluid communication with both inlet ports 37 and 38 and functions to separate debris from the air streams of either inlet 37 or 38. With this construction, a flexible conduit or hose may be conveniently connected to one of the inlets 37 or 38, while the other inlet 38 or 37 will be capped off with a closure plate (not shown). A spherical float valve 46 is mounted within a vertical cage 47 and is located in a forward portion of the collection tank 31. An exhaust port 48 is located in an upper forward portion of the collection tank 31 in a position adjacent the float valve 46.

A cyclone separator 51 is mounted exteriorly and forward of the collection tank 31. The cyclone separator 51 is mounted to a front portion 30 of the collection tank 31 by means of a movable support frame 52 which is pivotally mounted to the collection tank and pivotally mounted to the cyclone separator. The support frame 52 includes a pair of horizontal arms 53 and 54 and a pair of vertical legs 55 and 56 which act to brace the horizontal arms. A control arm 58 (FIGS. 2 and 9) is pivotally attached at one end to the forward portion 30 of the collection tank 31 and is pivotally attached at an opposite end to the cyclone separator 51. The control arm 58 is longer than the horizontal arms 53 of the support frame 52 to maintain the orientation of the cyclone separator with respect to the longitudinal axis 28. A hydraulic cylinder 59 is pivotally mounted at one end to a forward portion of the collection tank and pivotally mounted at an opposite end to the support frame 52 for moving the support frame between a position in which the cyclone separator 51 is held adjacent the longitudinal axis 28 of the truck frame 23 and a position extended laterally approximately three feet therefrom.

As illustrated in FIG. 1, the cyclone separator 51 mounted exteriorly of the collection tank 31 includes a lower portion 61 and an upper portion 62. The upper portion 62 has an airstream inlet 63 positioned to direct an airstream substantially tangentially into the upper portion of the cyclone separator 51. A flexible, extensible airstream coupling or hose 64 extends between, and is in fluid communication with, exhaust port 48 of the collection tank 31 and airstream inlet 63 of the cyclone separator 51. An airstream outlet 71 (FIGS. 2 and 9) is positioned in the upper portion 62 of cyclone separator 51.

The cyclone separator 51 further includes a particle release mechanism 66 for discharging accumulated particles from the lower portion 61 of the particle separator 51. The particle release mechanism 66 includes an upper sliding gate valve 67, a lower accumulation chamber 68 and a lower sliding gate valve 69. A particle transport conduit 70 is mounted to a lower portion of the collection tank 31 and is closed at its rear end by door 36 and its forward open end is in fluid communication with the lower accumulation chamber 68. A particle movement means, such as an auger (not shown), is mounted within the transport conduit 70 for moving accumulated particles from the lower accumulation chamber 68 of the cyclone separator 51 rearwardly through the particle transport conduit 70 and out of the rear end opening of the particle transport conduit when door 36 is open.

As illustrated in FIGS. 2-8, a filter bag house 75 houses a number of filter bags 76. The filter bag house 75 is a roughly rectangular box having an unshown upper lid hinged at one end for access to an upper portion of the bag house. The filter bags 76 are arranged within the bag house 75 in a series of spaced rows forming a grid. The bag house 75 has an airstream inlet 77 and an airstream outlet or plenum 78. A flexible extendable airstream coupling or hose 79 extends between, and is in communication with, airstream outlet 71 of cyclone separator 51 and airstream inlet 77 of filter bag housing 75.

Figure 6A:
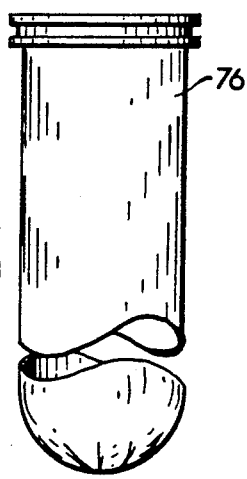
FIG. 6a and FIG. 6b are side elevational views of a filter bag and its inner support, with FIG. 6b showing the bag in cross section.
Figure 6B:
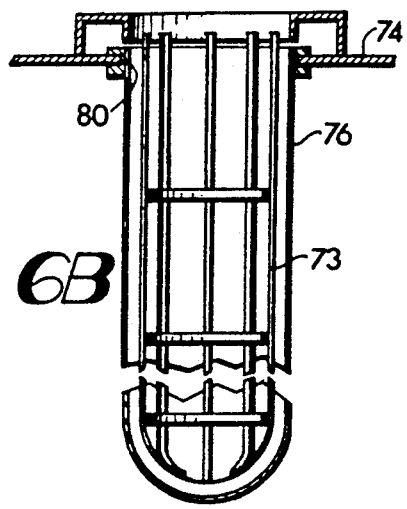

As illustrated in FIGS. 6A and 6B, the filter bags 76 are elongated and generally sock-shaped and are mounted within apertures 80 in an upper flange or deck 74 of the filter bag house 75. An inner cage structure 73 placed within each of the filter bags prevents the filter bags from collapsing upon themselves during operation of the vacuum system.

Figure 5:
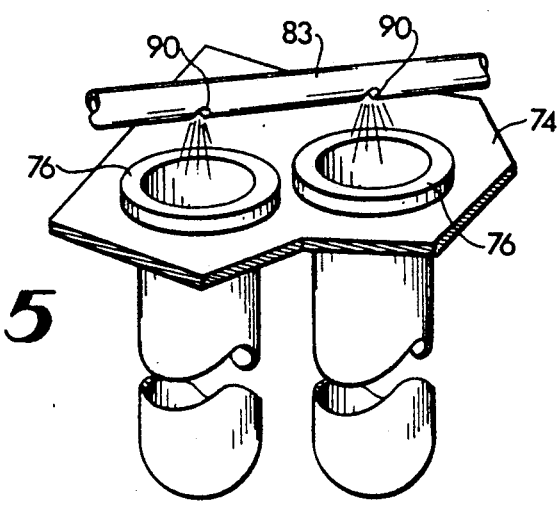
FIG. 5 is a perspective illustration of a portion of the portion of the air purge system of the portable vacuum cleaning system shown in FIG. 3.

As illustrated in FIGS. 2 and 3, a pair of air purge pipe grids 81 and 82 overlie the array of filter bags within the filter bag house. The air purge pipe grids each comprise a series of elongated conduits 83 (FIG. 3) in fluid communication with manifolds 84 and 85. The manifolds in turn are in fluid communication with a generally T-shaped header 87. The manifolds 84 and 85 each have an end which is rotatably received within openings 88 and 89 of the header 87 and the manifolds are rotatably mounted to the filter bag housing 75. So constructed, either or both of the air purge pipe grids 81 and 82 can be pivoted for access to the filter bags such as for repair or replacement. As shown in FIG. 5, each conduit 83 includes a series of spaced apertures 90 positioned along the conduits at positions which overlie the filter bags 76. A flexible supply conduit 92 (FIG. 3) is attached to the T-shaped header 87.

Figure 4:
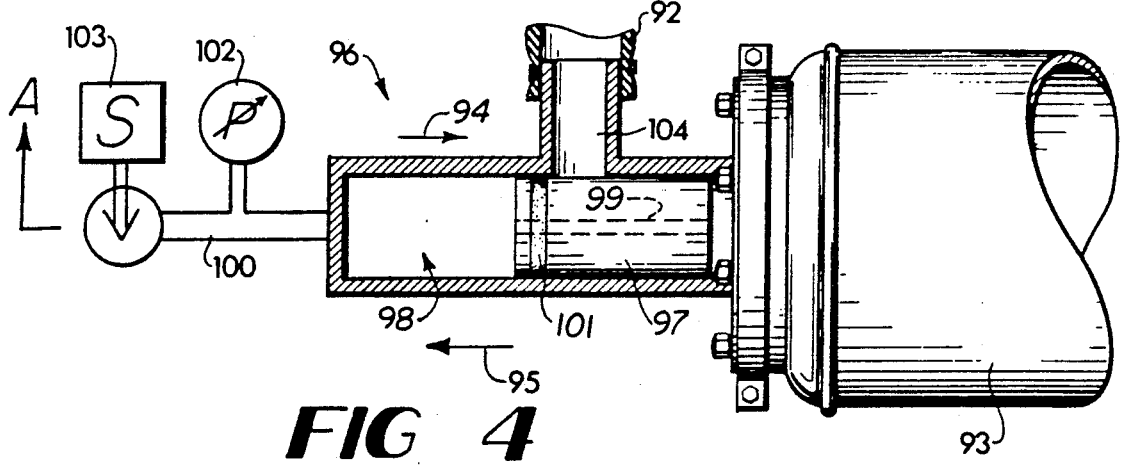
FIG. 4 is a partial plan view of the valve control arrangement and the air plenum chamber of the air purge system of the portable vacuum cleaning system of FIG. 1.

As illustrated in FIGS. 1, 2, and 4, compressed air reservoir 93 is mounted exteriorly to a forward portion of the filter bag housing 75. As shown in FIG. 4, the compressed air reservoir is in communication with a valve assembly 96 available from Martin Engineering Company of Neponset, Ill. The valve assembly 96 includes a cylindrical valve piston 97 slidably received within a valve chamber 98. The valve piston 97 includes a narrow internal passageway 99 extending completely through the valve piston 97 and an annular seal 101 positioned on the outer portion of the valve piston 97. A pressure sensitive switch 102 is mounted in fluid communication with valve chamber 98 for creating a signal upon the increase of pressure up to a predetermined level within the valve chamber. A solenoid valve 103 is responsive to the signal created by the pressure sensitive switch 102 and alternately connects the valve chamber to the source of compressed air and connects the valve chamber to atmosphere. Valve assembly 96 further includes an outlet port 104 to which is coupled the flexible supply conduit 92.

A positive displacement blower 111 (FIGS. 1 and 2) is driven by an auxiliary engine (not shown), or by other means and supplies compressed air to the reservoir 93 and creates the airstream flowing through the various chambers. The blower includes an intake port 112 (FIG. 2) in communication with a HEPA type filter 113. The HEPA filter is in turn in communication with the plenum 78 of the filter bag house 75. The blower further has an exhaust port 114 in communication with a large vertical silencer 115.

Figure 7:
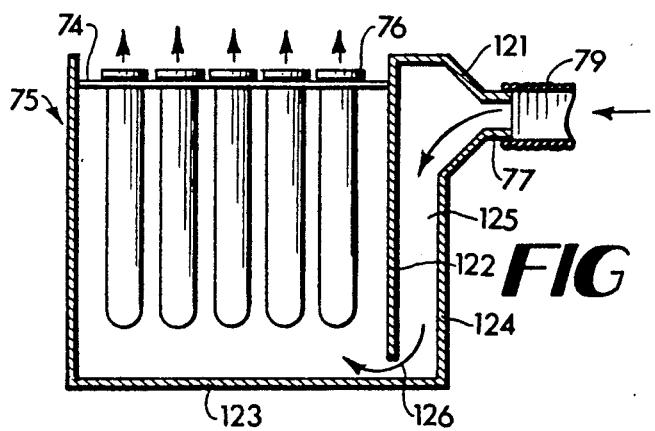
FIG. 7 is a cross section of the bag house with some elements removed for clarity of illustration.
Figure 8:
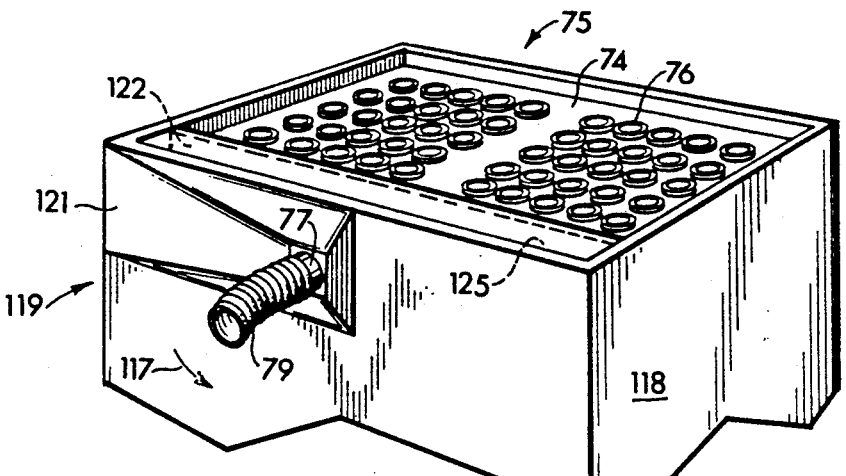
FIG. 8 is a perspective illustration of a portion of the portable vacuum cleaning system of FIG. 1, with some elements removed for clarity of illustration.

As shown in FIGS. 7 and 8, the filter bag house 75 preferably has an intake plenum 121 positioned asymmetrically on the filter bag house. The bag house further includes a baffle partition or vertical wall 122 which does not extend completely to a bottom surface 123 of the bag house. An outer surface 124 of the bag house together with the baffle partition 122 and the wall surfaces 118 and 119 of the bag house 75 define a relatively thin flat passageway or chamber 125 through which incoming air passes. This chamber extends the length and height of the filter bag housing.

FIGS. 10, 11 and 12 show the portable vacuum cleaning system 10 in a second preferred form. In this embodiment, means are provided for elevating the cyclone separator 51. The lifting means 140 comprises a fixed track 141 mounted to the bulkhead 30 of the collection tank 31 and a slidable rail 142 movably mounted to the fixed track 141. Four guide rollers 143 are rotatably mounted to the fixed track 141 in mutually spaced positions straddling the slidable rail 142. In this manner, the guide rollers 143 operate to restrict the movement of the slidable rail 142 to up and down translational motions.

Support frame 52 is mounted to the slidable rail 142 so that as the slidable rail is raised or lowered, the cyclone separator 51 is carried therewith. In this regard, horizontal arms 53 and 54 are each rotatably mounted at one end to the slidable rail 142 and are each rotatably mounted at an opposite end to the cyclone separator. A length of flexible link, steel chain 145 is mounted at one end to a lower portion of slidable rail 142 and is mounted at an opposite end to the bulkhead 30 of the collection tank 31. A hydraulic cylinder 146 is rigidly mounted to the bulkhead 30 in a vertical orientation and has a chain sprocket 142 rotatably mounted to an end the extendable ram of the cylinder. The chain 145 is looped about the chain sprocket 147 so that as the cylinder ram is extended and retracted the cyclone separator 51 is raised and lowered. A bracket 149 couples the chain 145 to the bulkhead 30 and a second bracket 150 couples the opposite end of the chain to the slidable rail 142.

A portion of the fixed track 141 extends above the top of the collection tank 31 and is secured to the collection tank by means of a lift brace 148. The lift brace is secured at one end to an upper portion of the fixed track and is secured at an opposite end to the collection tank 31. The lift brace is particularly useful for stabilizing the fixed track and the remainder of the lifting means when the cyclone separator 51 is in the raised position, as illustrated in FIG. 12.

OPERATION

In general, the device may be operated as follows. Particle laden air may be drawn in through either of the inlet ports 37, 42, to enter collection tank 31. In one manner of operation, a flexible conduit is connected at one of its ends to inlet port 37 and air and debris are drawn in through inlet port 37 and pass through cyclonic ring separator 43 to achieve a first stage of filtration. Air exiting from the cyclonic ring separator 43 moves about within the collection tank 31, with the heavier particles contained therein falling by gravity to the bottom of the collection tank. The airstream then passes through exhaust port 48 (FIGS. 1 and 2) and enters the exterior cyclone separator 51. The exterior cyclone separator 51 acts to further separate the remaining heavy particles from the air stream with the heavier particles falling to the bottom of the exterior cyclone and the lighter particles being carried by the airstream out of the particle separator through the airstream outlet 71. The air stream and debris remaining in the air stream move into the filter bag house.

As the airstream enters into and passes through the filter bag house 75, the airstream passes through the individual filter bags 76. The filter bags 76 further filter out most of the remaining particles in the airstream. As the airstream exits the filter bags, it is drawn through the filter bag housing plenum 78, and into the HEPA filter 113. After passing through the HEPA filter, the airstream is drawn into the blower 111 and is subsequently exhausted through the silencer 115.

As shown in FIG. 1, debris collected in the large cylindrical collection tank 31 can be dumped at a collection site or into another transport vehicle by opening the movable rear cover 36 and tilting the collection tank 31 by operation of the hydraulic cylinder 33.

In many instances the debris to be vacuumed up contains a significant amount of water or other liquid. Much of this liquid is collected in the collection tank 31. Should the liquid level in the collection tank rise to the point that the collection tank is nearly full, the spherical float 46 (FIGS. 1 and 2) is lifted by the liquid to a position adjacent the exhaust port 48. The float valve thus blocks the port, causing a lower pressure to be abruptly drawn by the blower within the remainder of the system. A pressure sensing switch (not shown) detects the increased vacuum and shuts off the blower motor. Thus, the float valve and the pressure switch act as a safety feature to prevent excessive liquid from being introduced into the subsequent filtration stages and signals to the operator that the collection tank is full.

According to the present invention and as illustrated in FIGS. 7 and 8, as the airstream enters the filter bag house 75 through the airstream inlet 77, it is directed through the filter bag house in a generally cross-flow manner to maximize the effectiveness of the filter bags. As the airstream enters through the inlet 77 it is spread out somewhat by the intake plenum 121. The intake plenum is positioned on the filter bag house and configured to direct the airflow from one end 119 of the filter bag housing downwardly and toward an opposite end 118, in the direction of arrow 117. This spreading or dispersing of the airstream occurs as the airstream moves downwardly within the chamber 125 as shown in FIG. 7. As the airstream makes the turn past a lower portion of the baffle partition 122 as shown by arrow 126, the airstream comprises a relatively broad flat flow of air, as opposed to a narrow round airstream, such as that entering the inlet port 77. Providing such a broad flat airstream to the filter bags provides a better distribution of the airstream over the filter bags and maximizes the effectiveness of the filter bags by preventing the airstream from being directed to a relatively small number of the filter bags.

The filter bags are periodically cleaned on an ongoing basis during operation as follows. As shown in FIGS. 1 and 2, compressed air is provided, such as from the blower 111 or a compressor mounted to an auxiliary engine (unshown), to the compressed air reservoir 93. With the reservoir 93 initially uncharged and with the solenoid valve 103 allowing air to flow from the compressor therethrough to the valve chamber 98, air pressure forces the valve 97 to move in the direction of arrow 94 and air passes through the valve passageway 99. The piston moves to a position blocking outlet port 104, thereby allowing air passing through the passageway to pressurize the reservoir 93. Upon the attainment of a selected pressure within the reservoir and the valve chamber, the pressure sensitive switch 102 triggers solenoid 103 to move to the position to allow the valve chamber 98 to be exhausted to atmosphere for roughly one-half of a second. Thus, as shown in FIG. 4, this causes air to flow in the direction of arrow 95 from within the compressed air reservoir 93 through the passageway 99 and through the valve conduit 100 to atmosphere. Because of the sudden drop in pressure on one side of the piston 97 as compared with the pressure on the other side, the piston 97 is thereby caused to move suddenly in the direction of arrow 95 and uncovers outlet port 104. A large quantity of compressed air thereby moves rapidly and with sudden force from within the compressed air reservoir 93 through the valve chamber 98 and into the outlet port 104.

This "blast" of compressed air moves through the outlet port 104 into the flexible supply conduit 92 with a significant portion of the blast occurring over the first one-fourth of a second in which the outlet port is uncovered. The blast surges through the flexible supply conduit 92 to the header 87 and is distributed to the manifolds 84 and 85. The air travels along the conduits 83 and exits through the apertures 90 which are positioned adjacent and above the filter bags. By nature of the relatively large volume of air available from the reservoir 93 and the suddenness with which it is provided, a penetrating blast of air is delivered to all of the filter bags simultaneously.

As the compressed air is delivered from the reservoir to the filter bags, the pressure within the chamber 98 steadily drops. After roughly one-half of a second, the pressure sensitive switch 102 causes the solenoid 103 to close the valve chamber to atmosphere and allows air to flow from the compressed air source to the valve. The air pressure pushes the valve 97 in the direction of arrow 94 and air flows through the passageway 99 in the piston 97. In this manner the piston is moved into the closed position sealing off the outlet port 104, completing a cycle of operation.

Using such a large volume of compressed air to simultaneously purge all the filter bags has the additional advantage of providing a more sustained airflow or crossflow into the filter bags, thereby providing a more effective cleaning of each filter bag. It will also be recognized of course that by simultaneously cleaning all of the filter bags the need for complicated and unreliable control circuitry is reduced.

With the unshown lid of the filter bag house 75 moved to an open position or removed, access may be had to the filter bags for cleaning by rotating either or both of the air purge pipe grids 81 and 82 up and away from the filter bags 76.

The exterior cyclone separator 51 may be employed in either its position adjacent the longitudinal axis 28 or its position extended therefrom. In the adjacent or nested position shown in FIG. 2, particles which accumulate in the lower portion of the cyclone separator are moved to the lower accumulation chamber 68 by opening sliding upper gate valve 67 while lower sliding gate valve 69 is closed. Upper sliding gate valve 67 may then be closed and the material discharged from the accumulation chamber by either moving it through the particle transport conduit 70 or by opening the lower sliding gate valve 69 and dispensing the material to the ground or to a container positioned beneath the separator.

Figure 9:
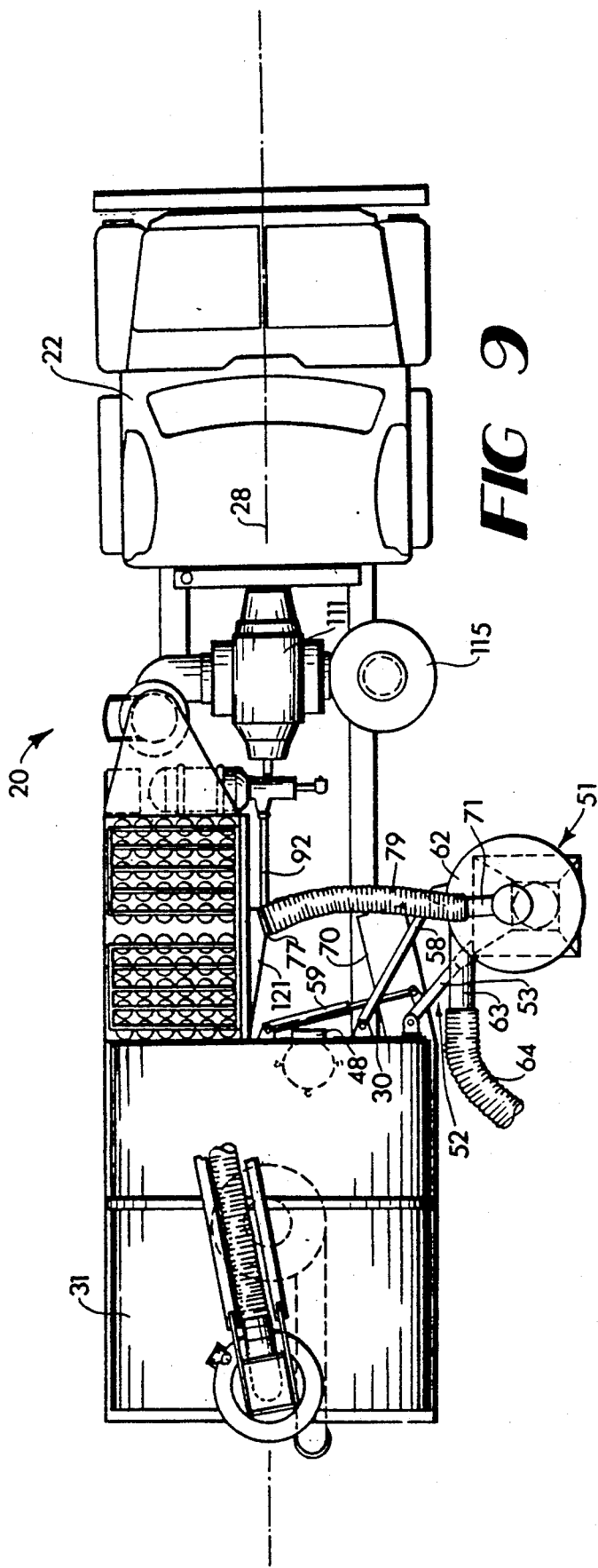
FIG. 9 is a plan view of the portable vacuum cleaning system of FIG. 2, showing the movable particle separator extended laterally.

The exterior cyclone separator 51 can be moved to its extended position shown in FIG. 9 by operation of the hydraulic cylinder 59. As the hydraulic cylinder causes the support frame 52 to pivot about the large collection tank 31, the control arm 58 acts to maintain the vertical orientation of the cyclone separator with respect to the horizontal axis 28. In other words, as the cyclone separator is swung out and away from the horizontal axis, the general orientation of the airstream inlet 63 and the airstream outlet 71 of the cyclone separator is maintained relative to the exhaust port 48 of the collection tank 31 and the airstream inlet 77 of the filter bag house 75. This has the advantage of allowing the airstream outlet 71 of the cyclone separator 51 to remain connected to the airstream inlet 77 of the filter bag housing 75, as by a flexible, extendable airstream coupling 79.

Figure 13:
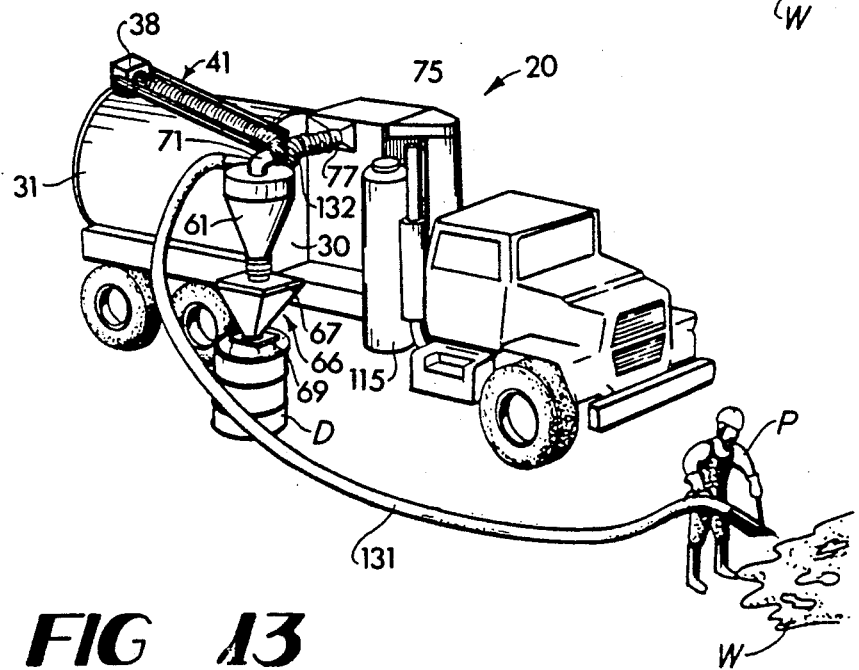

Providing a portable vacuum cleaning system with a cyclone separator movably mounted thereto for movement to a position extended laterally has the advantage of facilitating on-site transfer of the collected material to small containers, such as for example, 55-gallon drums. As shown in FIG. 13, the portable vacuum cleaning system can be configured so that waste W can be collected and deposited on-site into 55-gallon drums D. In one mode of use, an operator P manipulates a long, flexible conduit 131 to collect the waste W. As the waste W is drawn into the conduit by an airstream, the now particle-laden airstream is carried into the exterior cyclone separator 61 to achieve a first stage of filtration. Heavier particles collect in the bottom portion of the separator while lighter particles in the airstream exit through outlet 71. The airstream is then carried into the collection tank 31 through top inlet port 38. Once inside the collection tank the airstream is further filtered by the interior cyclone separator 43. The twice-filtered airstream then exits the collection tank through exhaust port 48 and is carried by conduit 132 to the inlet 77 of the filter bag housing 75. After achieving a third stage of filtration in the filter bag housing, the airstream passes through the HEPA filter, through the blower and exits through the silencer 115.

As debris collects in the lower portion of the cyclone separator 61, it may be periodically discharged with the particle release mechanism 66 to the drums D. With the lower sliding gate valve 69 closed, the upper sliding gate valve 67 may be opened to allow accumulated debris to move from the cyclone separator to the lower accumulation chamber 68. The upper sliding gate valve may then be closed and the lower sliding gate valve opened to allow the debris to pass from the accumulation chamber into the drum.

The lifting apparatus 140 shown in FIGS. 10-12 can be used to raise or lower the cyclone separator 51 roughly eight feet with the cyclone separator 51 in the nested position adjacent the truck or in the swung out position extended laterally from the horizontal axis of the vehicle. Providing a separator which can be both swung out and raised makes it easier to discharge collected material into small containers, auxiliary transport equipment or to a local site. For example, it might be more convenient to swing the cyclone separator out away from the vehicle a little more or a little less to properly align it with the intended collection receptacle, as compared with either moving the collection receptacle or moving the entire portable vacuum cleaning system 20.

Furthermore, by providing a portable vacuum cleaning system 20 which has a rather large collection tank 31 and a relatively small movable cyclone separator 51, a substantial degree of flexibility is achieved. For example, where large quantities of material are to be collected and transported to a remote location, the system can be used to deposit the collected material within the collection tank 31 and then transported. On the other hand, where the amount of the material to be collected is much smaller, the collected material can be discharged through the movable cyclone separator to small containers or auxiliary transport equipment so that the large vehicle need not travel to carry the relatively small amount of collected material to the remote storage site. Thus, the collection system is cost effective over a wide range of load capacities.

With the chain 145 extending from the slidable rail bracket 150 to the bulkhead bracket 149 and looped about the chain sprocket 147, as the chain sprocket is moved upwardly by the hydraulic cylinder, the chain sprocket acts as a pulley to provide a mechanical advantage to the hydraulic cylinder. In this construction, the effective stroke of the hydraulic cylinder is doubled so that the motion of the slidable rail 142 is twice as great as the motion of the hydraulic cylinder. This allows a compact cylinder with a four foot stroke to provide eight feet of lift for the slidable rail 142.

Figure 14:
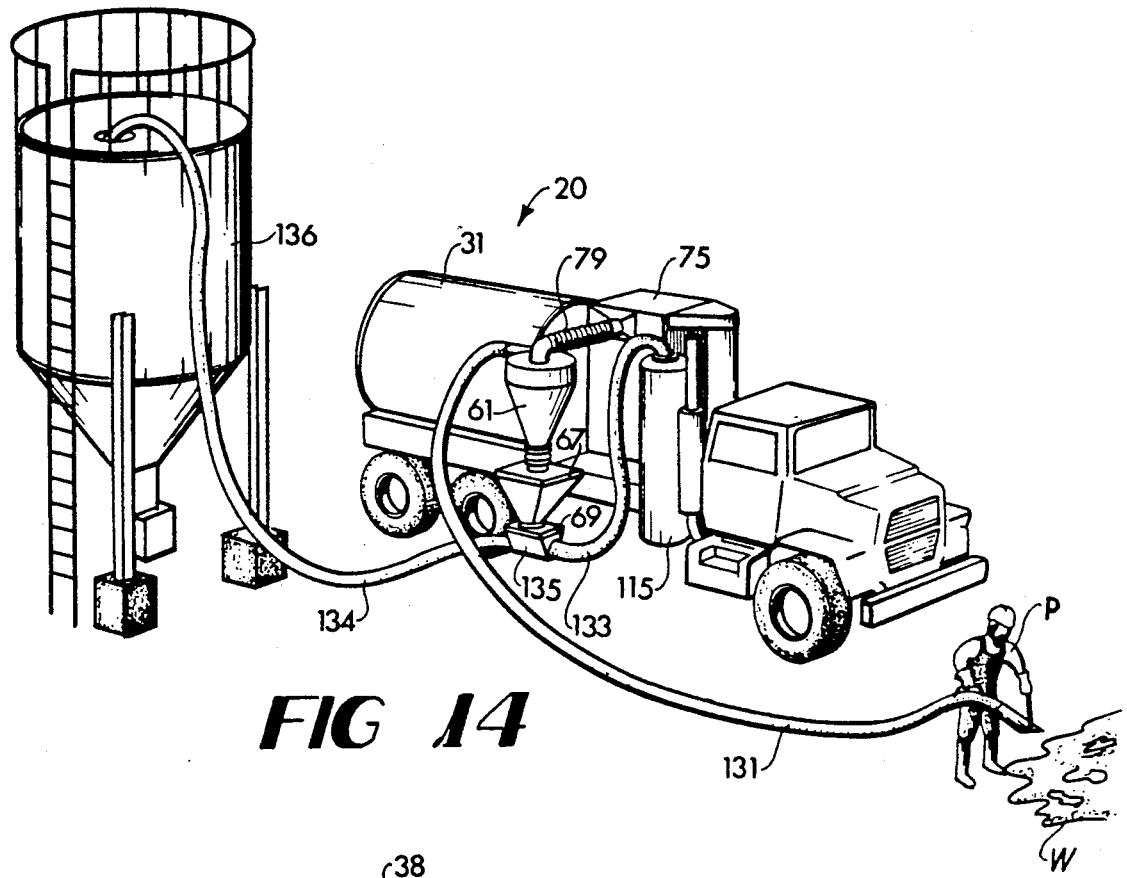
FIGS. 13 and 14 are perspective illustrations of examples of the portable vacuum cleaning system in use with the cyclone separator moved out from the vehicle.

As shown in FIG. 14, the portable vacuum cleaning system 20 having a cyclone separator mounted for lateral movement allows the system to be configured in yet another manner to allow the on-site disposal of accumulated debris. In this configuration, waste W is drawn through the conduit 131 and into the cyclone separator 61 to achieve a first stage of filtration. The airstream exits the cyclone separator 61 and moves directly to the filter bag house 65 by means of flexible coupling 79 to achieve a second stage of filtration. After passing through the HEPA filter, the blower and the silencer, the airstream is directed through a flexible conduit 133 and into a junction box 135. The airstream then moves through a flexible conduit 134 and is carried on into the large on-site collection tank 136. The junction box 135 is constructed so that as the airstream passes through it, it creates a source of low pressure and thereby draws particles from the accumulation chamber 68 into the airstream (with the sliding gate valves 67 and 69 in the open positions). In this manner, waste material may be continuously collected and deposited in the collection tank 136 on-site.

The above description illustrates principles of the invention in a preferred form. It will be obvious to one skilled in the art, however, that numerous modifications, additions and deletions may be made thereto without departing from the spirit and scope of the invention as set forth in the following claims.

We claim:

1. A portable vacuum cleaning system for separating particles from a particle-laden airstream, said system comprising:
   a vehicle comprising a frame supported by wheels, said vehicle frame having a longitudinal axis;
   a collection tank mounted to said vehicle frame;
   a first particle separator means comprising a cyclone separator coupled to said vehicle frame with said cyclone separator having a lower portion, an airstream inlet and an airstream exhaust;
   a second particle separator means mounted to said vehicle frame comprising a plurality of filter bags mounted within a filter bag house, said filter bag house having an airstream inlet and an airstream outlet;
   blower means for urging an airstream to pass in sequence through said collection tank, through said cyclone separator and through said bag house, and for urging an airstream applied to said filter bag house inlet to pass through said filter bag house through said filter bags in a first direction and to exit through said filter bag house outlet;
   movable support means for supporting said cyclone separator and moving it between a first position adjacent said vehicle frame and a second position displaced further laterally of said longitudinal axis; and
   particle release means mounted to said lower portion of said cyclone separator for releasing accumulated particles from said cyclone separator.

2. The portable vacuum cleaning system as claimed in claim 1 wherein said movable support means comprises first and second rigid members of selected lengths, each said rigid member being pivotally coupled to said cyclone separator and pivotally coupled to said portable support frame, with said length of said first rigid member being different than said length of said second rigid member for maintaining a generally constant vertical orientation of said cyclone separator with respect to said longitudinal axis.

3. The portable vacuum cleaning system as claimed in claim 1 further comprising a reciprocatable actuating means for moving said cyclone separator between said first and second positions.

4. The portable vacuum cleaning system as claimed in claim 1 wherein said movable support means comprises means for moving said cyclone separator between raised and lowered positions.

5. The portable vacuum cleaning system as claimed in claim 4 wherein said means for moving said cyclone separator between said raised and lowered positions comprises a fixed track mounted to said collection tank, a slidable rail movably mounted to said fixed track, and means for moving said slidable rail relative to said fixed track.

6. The portable vacuum cleaning system as claimed in claim 1 and further including an air purge means comprising a reservoir for storing compressed air, a valve means for releasing compressed air from said reservoir, and compressed air delivery means for delivering compressed air released from said reservoir to said plurality of groupings of filter bags.

7. The portable vacuum cleaning system as claimed in claim 6 wherein said compressed air delivery means comprises a delivery conduit in fluid communication with a header, said header being in fluid communication with a plurality of outlet tubes having air outlets adjacent said filter bags.

8. The portable vacuum cleaning system as claimed in claim 6 wherein said compressed air delivery means comprises a delivery conduit in fluid communication with a header, said header being in fluid communication with first and second manifolds, said first and second manifolds being in fluid communication with first and second arrays of outlet tubes respectively, with said outlet tubes having air outlets adjacent said filter bags.

9. The portable vacuum cleaning system as claimed in claim 8 wherein said first and second manifolds are each rotatably mounted to said header.

10. The portable vacuum cleaning system as claimed in claim 6 further comprising control means for controlling said air purge means, said control means being responsive to the attainment of a selected pressure within said reservoir.

11. The portable vacuum cleaning system as claimed in claim 10 wherein said control means comprises a pressure sensitive switch in fluid communication with said reservoir for creating a signal in response to said selected pressure, valve means in fluid communication with said reservoir and said compressed air delivery means, and actuator means responsive to said signal for opening and closing said valve means.

12. A portable vacuum cleaning system for separating particles from a particle laden airstream, said system comprising:
   a portable frame having a longitudinal axis;
   a large collection tank mounted on said portable frame for collecting and transporting the collected particles to a dump site, said collection tank having an airstream inlet for receiving a particle laden airstream and an airstream outlet for discharging the airstream,
   a filter bag house mounted to said portable frame with a plurality of filter bags mounted therein, said filter bag house having an airstream inlet and an airstream outlet;
   a cyclone particle separator movably mounted to said portable frame and including an airstream inlet and an airstream outlet,
   blower means mounted on said portable frame and including an airstream inlet in communication with the airstream outlet of said filter bag house for inducing a particle laden stream of air to flow through said large collection tank, through said cyclone particle separator and through said filter bag house,
   movable support means for supporting said cyclone particle separator from said portable frame and for moving said cyclone particle separator between a first position adjacent said portable frame longitudinal axis and a second position extended further laterally from said portable frame longitudinal axis,
   first flexible conduit means for selectively connecting the airstream outlet of said cyclone particle separator either in communication with the airstream inlet of said bag house or in communication with the airstream inlet of said large collection tank when said cyclone particle separator is in its second position, and
   second flexible conduit means for connection at one of it sends to the airstream inlet of said cyclone particle separator and with its other end free for collecting particles from other sources.

13. The portable vacuum cleaning system as claimed in claim 12 wherein said movable support means includes means for moving said cyclone particle separator between said first and second positions while maintaining a generally constant orientation of said cyclone particle separator with respect to said longitudinal axis, said means comprising first and second rigid members, said first and second rigid members being of different lengths and each being pivotally attached to said cyclone particle separator and pivotally coupled to said portable support frame.

14. The portable vacuum cleaning system as claimed in claim 13 further comprising a reciprocatable actuating means for moving said cyclone particle separator between said first and second positions.

15. The portable vacuum cleaning system as claimed in claim 12 wherein said movable support means comprises means for moving said cyclone separator between raised and lowered positions.

16. The portable vacuum cleaning system as claimed in claim 15 wherein said means for moving said cyclone separator between said raised and lowered positions comprises a fixed track mounted to said collection tank, a slidable rail movably mounted to said fixed track, and means for moving said slidable rail relative to said fixed track.

17. A portable vacuum cleaning system for separating particles from particle-laden airstream, said system comprising:
   a portable frame having a longitudinal axis;
   a particle separator mounted on said portable frame with said separator means having a lower portion, an airstream inlet and an airstream outlet;
   blower means for urging an airstream to pass sequentially through said airstream inlet, through said particle separator means and to exit through said airstream outlet;
   the improvement therein comprising: movable support means for supporting said particle separator and moving it between a first position adjacent said portable frame longitudinal axis and a second position located further laterally of said longitudinal axis; and
   particle release means mounted to said lower portion of said particle separator for releasing accumulated particles from said particle separator when said particle separator is in said second position.

18. The portable vacuum cleaning system as claimed in claim 17 wherein said movable support means comprises means for moving said first particle separator between said first and second positions while maintaining a generally constant vertical orientation of said particle separator with respect to said longitudinal axis.

19. The portable vacuum cleaning system as claimed in claim 17 wherein said movable support means comprises first and second rigid members of selected lengths, each said rigid member being pivotally coupled to said particle separator and pivotally coupled to said portable support frame, with said length of said first rigid member being different than said length of said second rigid member.

20. The portable vacuum cleaning system as claimed in claim 17 further comprising a reciprocatable actuating means for moving said particle separator between said first and second positions.

21. The portable vacuum cleaning system as claimed in claim 17 wherein said particle separator means comprises a cyclone separator having an upper portion and a lower portion and wherein said airstream outlet is adjacent said upper portion and said airstream inlet is positioned to direct the airstream substantially tangentially into said cyclone separator.

22. The portable vacuum cleaning system as claimed in claim 17 wherein said particle release means comprises a particle accumulation chamber, a first valve in communication with said accumulation chamber and with said lower portion, and a second valve in communication with said accumulation chamber, whereby particles accumulating in the lower portion of the particle separator may be cyclically transferred to the accumulation chamber and then transferred out of the accumulation chamber by operation of the valves.

23. In a portable vacuum cleaning system for separating particles from a particle-laden airstream of the type having a portable frame with a longitudinal axis, a large collection tank mounted to the frame and having an airstream inlet and an airstream outlet, a cyclone separator having an airstream inlet, an airstream outlet and a lower portion, a filter bag house for housing a plurality of filter bags and having an airstream inlet and an air stream outlet, blower means for urging an airstream to pass through the large collection tank and to pass through the cyclone separator and to pass through the filter bag house and the filter bags, the improvement therein comprising:

movable support means for supporting the cyclone separator and moving it between a first position adjacent the portable frame and a second position extended laterally from the frame longitudinal axis;

the cyclone separator comprising a lower accumulation chamber adjacent the lower portion and having particle release means for releasing accumulated particles from the cyclone separator;

whereby the cyclone separator can be moved to the extended position away from the frame to facilitate the discharge of particles collected in the lower portion of the cyclone separator to other containers.

24. The improvement as claimed in claim 23 wherein said movable support means further comprises means for moving the cyclone separator between raised and lowered positions.

25. In a portable vacuum cleaning system for separating particles from a particle-laden airstream of the type having a portable frame, a collection tank mounted to the frame and having an airstream inlet and an airstream outlet, a cyclone separator having an airstream inlet, an airstream outlet, a lower portion, and a particle release mechanism at said lower portion, a filter bag house having an airstream inlet and an airstream outlet and housing a plurality of filter bags, blower means for urging an airstream to pass in a first selected sequence through the collection tank and to pass through the cyclone separator and to pass through the filter bag house and the filter bags, the improvement therein comprising:

means for reconfiguring the system to cause the airstream to pass through selected ones of the collection tank, filter bag house and cyclone separator in a second sequence different than the first selected sequence; and movable support means for supporting said cyclone separator in a first position adjacent said frame and a second position displaced from said frame whereby the cyclone separator is suspended away from the frame and its collection of particles released from its particle release mechanism to a collector.

26. The improvement of claim 25 wherein in said second sequence the blower urges an airstream to pass in sequence into the cyclone separator inlet, through the cyclone separator and out of the cyclone separator outlet, into the filter bag house inlet, through the filter bag house and out of the filter bag house outlet, while by-passing the collection tank.

27. The improvement of claim 25 wherein in said second sequence the blower urges an airstream to pass in sequence into the cyclone separator inlet, through the cyclone separator and out of the cyclone separator outlet, into the collection tank inlet, through the collection tank and out of the collection tank outlet, and into the filter bag house inlet, through the filter bag house and out of the filter bag house outlet.

28. The improvement of claim 25 wherein in said second sequence the blower urges an airstream to pass in sequence into the collection tank inlet, through the collection tank and out of the collection tank outlet, into the filter bag house inlet, through the filter bag house and out of the filter bag house outlet, while by-passing the cyclone separator.

29. In a portable vacuum cleaning system for separating particles from a particle-laden airstream of the type having a portable frame having a longitudinal axis, a collection tank mounted to the frame and having an airstream inlet and an airstream outlet, a cyclone separator having an airstream inlet, and airstream outlet and a lower portion, a filter bag house having an airstream inlet and an air stream outlet and housing a plurality of filter bags, blower means for urging an airstream to pass in a first selected sequence through the collection tank and to pass through the cyclone separator and to pass through the filter bag house and the filter bags, the improvement therein comprising:

reconfiguring means for reconfiguring the system to cause the airstream to pass through selected ones of the collection tank, filter bag house and cyclone separator in a second sequence different than the first selected sequence, said reconfiguring means comprising moveable support means for supporting the cyclone separator and moving it between a first position adjacent the portable frame and a second position extended laterally from said frame longitudinal axis.

30. The improvement of claim 29 further comprising a lower accumulation chamber adjacent the lower portion of the cyclone separator and having particle release means for releasing accumulated particles from the cyclone separator.

31. A portable vacuum collecting vehicle for separating and collecting particles from an air stream comprising:

a vehicle having a frame supported on wheels and movable in a forward direction, a large collection chamber mounted on said frame and including an air inlet and an air outlet, said collection chamber including means for separating particles from a stream of air drawn through said chamber from its air inlet to its air outlet, a cyclone separator including an air outlet and an air inlet in communication with the air outlet of said large collection chamber and a particle collection chamber for collecting particles from a stream of air drawn through said cyclone separator, a bag house separator including an air outlet and an air inlet in communication with the air outlet of said cyclone separator, air compressor means including an air inlet in communication with the air outlet of said bag house for drawing a stream of air in sequence through said large collection chamber, said cyclone separator and said bag house, means for moving said cyclone separator and its particle collection chamber in a lateral direction and for elevating said cyclone separator and its particle collection chamber to a position above a collector positioned adjacent said vehicle frame for dumping the particles collected to the collector.

32. The portable vacuum collecting vehicle of claim 31 and further including flexible conduit means for connecting the air outlet of said cyclone separator to the inlet of said bag house separator.

33. The portable vacuum collecting vehicle of claim 31 and further including flexible conduit means for connection at one end to the air inlet of said cyclone separator and its other end is free for use to direct air and particles from sites at which the vehicle is located to the particle collection chamber of said cyclone separator.

* * * * *

UNITED STATES PATENT AND TRADEMARK OFFICE
CERTIFICATE OF CORRECTION

PATENT NO. : 5,030,259
DATED : July 9, 1991
INVENTOR(S) : Earl R. Bryant, Jerry W. Richards, James N. Carnathan, William M. Franklin, Earnest N. Hutcheson, Elie A. Boukhier It is certified that error appears in the above—identified patent and that said Letters Patent is hereby corrected as shown below:

Column 14:
    Claim 17, line 5, after "separator", insert --means--.

Signed and Sealed this

Eleventh Day of October, 1994

Attest:

BRUCE LEHMAN

Attesting Officer                Commissioner of Patents and Trademarks

REEXAMINATION CERTIFICATE (2260th)
United States Patent [19]
Bryant et al.

[11] B1 5,030,259
[45] Certificate Issued Apr. 5, 1994

[54] PORTABLE VACUUM CLEANING SYSTEM

[75] Inventors: Earl R. Bryant; Jerry W. Richards, both of Birmingham; James N. Carnathan, Heuytown; William M. Franklin, Birmingham; Earnest N. Hutcheson, Birmingham; Elie A. Boukhier, Birmingham, all of Ala.

[73] Assignee: Guzzler Manufacturing, Inc., Birmingham, Ala.

Reexamination Request:
No. 90/002,915, Dec. 16, 1992

Reexamination Certificate for:
Patent No.: 5,030,259
Issued: Jul. 9, 1991
Appl. No.: 452,118
Filed: Dec. 18, 1989

[51] Int. Cl.⁵ .......................... A47L 5/00; B01D 50/00
[52] U.S. Cl. .................... 55/302; 15/340.1; 55/341.1; 55/343; 55/345; 55/356; 55/432; 55/459.1
[58] Field of Search ............... 15/340.1; 55/276, 283, 55/302, 341.1, 342, 343, 345, 356, 432, 458, 459.1; 406/171, 172, 173

[56] References Cited

U.S. PATENT DOCUMENTS

| | | | |
|---|---|---|---|
| 3,842,461 | 10/1974 | Wurster | 15/326 |
| 3,870,489 | 3/1975 | Shaddock | 55/314 |
| 4,017,281 | 4/1977 | Johnstone | 55/334 |
| 4,121,915 | 10/1978 | Anderson | 55/227 |
| 4,218,226 | 8/1980 | Boozer | 55/274 |
| 4,227,893 | 10/1980 | Shaddock | 15/340.1 |
| 4,509,963 | 4/1985 | Jackson | 55/324 |
| 4,574,420 | 3/1986 | Dupré | 15/331 |
| 4,578,840 | 4/1986 | Pausch | 15/340 |
| 4,668,131 | 5/1987 | Hart, Sr. et al. | 406/23 |
| 4,723,969 | 2/1988 | DeMarco | 55/97 |
| 4,828,187 | 5/1989 | Davis et al. | 241/24 |
| 4,935,984 | 6/1990 | Bryant et al. | 15/302 |

FOREIGN PATENT DOCUMENTS

| | | | |
|---|---|---|---|
| 1241509 | 9/1988 | Canada | 15/340.1 |
| 2728712 | 1/1979 | Fed. Rep. of Germany | 55/302 |

OTHER PUBLICATIONS

"We Clean Air" Bulletin 311 from R. A. Packaged Dust Collector, American Precision Industries, Dec. 1968.

*Primary Examiner*—Scott Bushey

[57] ABSTRACT

A vehicle mounted vacuum cleaning system (20) includes a portable frame (23), a cyclone separator (51) mounted to the frame and a blower (111) for urging in the airstream to pass through the cyclone separator. Movable support arms (53, 54) are provided for supporting the cyclone separator and for moving it between a first position adjacent the portable frame and a second position extended laterally from the portable frame. Lifting track (141) and rail (142) are provided for moving the cyclone separator between raised and lowered positions. The vacuum cleaning system further includes a plurality of filter bags (76) mounted within a filter bag house (75) and air purge grids (81 and 82) for cleaning all of the filter bags simultaneously. The air purge system includes a reservoir (93) for storing compressed air and valve means (96) for releasing a charge of compressed air into the filter bags in a direction generally opposite to the normal direction of airflow through the filter bags in response to the attainment of a selected pressure within the reservoir.

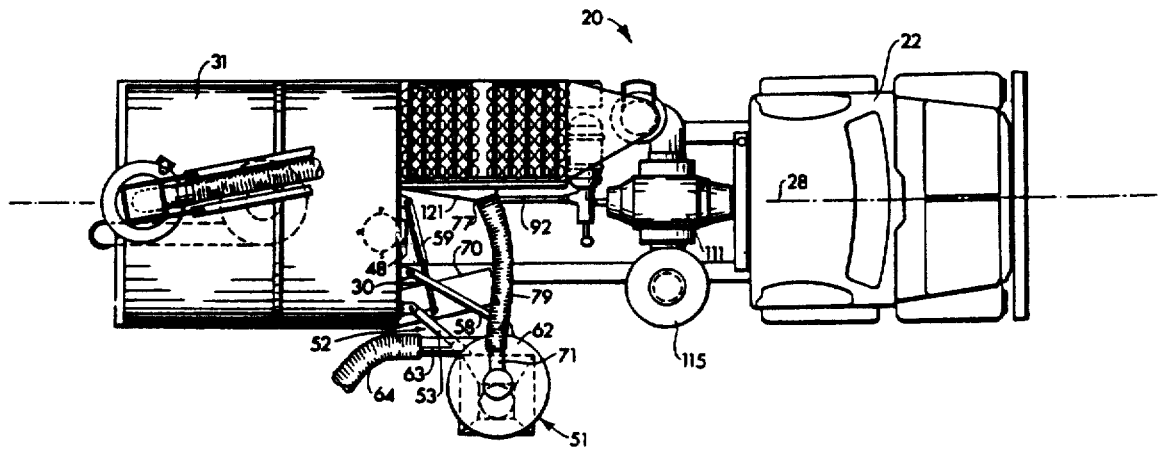

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16, and 23-33 is confirmed.

Claim 21 is cancelled.

Claims 17 and 18 are determined to be patentable as amended.

Claims 19, 20, and 22, dependent on an amended claim, are determined to be patentable.

New claims 34-41 and added and determined to be patentable.

17. A portable vacuum cleaning system for separating particles from a particle-laden airstream, said system comprising:
   a portable frame having a longitudinal axis;
   *a large collection tank mounted on said portable frame for collecting and transporting particles separated from the airstream;*
   *a filter bag house mounted on said portable frame;*
   a *cyclone* particle separator mounted on said portable frame with said *particle* separator [means] having a lower portion, an air stream inlet, and an airstream outlet;
   blower means for urging an airstream to pass *through said bag house and said collection tank and* sequentially through said airstream inlet, through said particle separator [means] and to exit through said airstream outlet;
   the improvement therein comprising:
   movable support means for supporting said particle separator and moving [it] *said particle separator independently with respect to said collection tank and said filter bag house* between a first position adjacent said portable frame longitudinal axis and a second position located further laterally of said longitudinal axis; [and]
   *a conduit for connection at one of its ends to said air stream inlet of said particle separator and with its other end movable for receiving particles from about said system; and*
   particle release means mounted to said lower portion of said particle separator for releasing accumulated particles from said particle separator when said particle separator is in said second position *to facilitate discharge of particles collected in the particle separator.*

18. The portable vacuum cleaning system as claimed in claim 17 wherein said movable support means comprises means for moving said [first] particle separator between said first and second positions while maintaining a generally constant vertical orientation of said particle separator with respect to said longitudinal axis.

34. *The portable vacuum cleaning system as claimed in claim 23 and wherein said blower means includes means for directing an airstream to pass in sequence first through the large collection tank and then through the cyclone separator and then through the bag house and the filter bags.*

35. *The portable vacuum cleaning system as claimed in claim 23 and wherein said blower means includes means for directing an airstream to pass in sequence first through the cyclone separator and then through the large collection chamber and then through the bag house and filter bags.*

36. *The portable vacuum cleaning system as claimed in claim 23 and wherein said blower means includes means for directing an airstream to pass in sequence first through the cyclone separator and then through the bag house and filter bags without passing through the large collection chamber.*

37. *A portable vacuum cleaning system for separating particles from a particle-laden airstream, said system comprising:*
   *a portable frame having a longitudinal axis;*
   *a large collection tank mounted on said portable frame for collecting and transporting particles separated from the airstream, said large collection tank having an inlet for receiving a particle-laden airstream and an outlet for discharging the airstream;*
   *a cyclone particle separator mounted on said portable frame for separating and collecting particles from the airstream, with said particle separator having an upper portion and a lower portion, an airstream inlet adjacent said upper portion and positioned to direct the airstream substantially tangentially into said cyclone separator, and an airstream outlet adjacent said upper portion;*
   *blower means for urging an airstream to pass sequentially through said airstream inlet, through said particle separator and to exit through said airstream outlet and sequentially through said inlet and said outlet of said large collection tank;*
   *the improvement therein comprising:*
   *movable support means for supporting said particle separator and moving said particle separator between a first position adjacent said portable frame longitudinal axis and a second position located further laterally of said longitudinal axis;*
   *a conduit for connection at one of its ends to said airstream inlet of said particle separator and with its other end available for receiving the particle-laden airstream; and*
   *particle release means mounted to said lower portion of said particle separator for releasing accumulated particles from said particle separator when said particle separator is in said second position.*

38. *A portable vacuum cleaning system for separating particles from a particle-laden airstream, said system comprising:*
   *a portable frame having a longitudinal axis;*
   *a large collection tank tiltably mounted on said portable frame for collecting and transporting collected particles, said large collection tank having an inlet for receiving a particle-laden airstream and an outlet for discharging the airstream;*
   *a rear door for discharge of material in said large collection tank;* means for opening said rear door and tilting said large collection tank to dump material from said large collection tank;

a cyclone particle separator movably mounted on said portable frame for separating and collecting particles from the particle-laden airstream, with said separator having a lower portion, an airstream inlet, and an airstream outlet;

a bag house mounted on said portable frame for separating and collecting particles from the particle-laden airstream received from said cyclone separator and said large collection tank, blower means for urging an airstream to pass sequentially through said airstream inlet, through said particle separator and to exit through said airstream outlet, and also through said large collection tank and said bag house;

the improvement therein comprising: movable support means for supporting said particle separator and moving said particle separator independently of said large collection tank and said bag house between a first position adjacent said portable frame longitudinal axis and a second position located further laterally of said longitidunal axis;

first conduit means for connection at one of its ends to said airstream outlet of said particle separator and said inlet of said large collection tank when said particle separator is located in its second position;

second conduit means for connection at one of its ends to said airstream inlet of said particle separator and with its other end movable for receiving particles from about said system; and particle release means mounted to said lower portion of said particle separator for releasing accumulated particles from said particle separator when said particle separator is in said second position to facilitate discharge of collected particles from said particle separator.

39. A portable vacuum cleaning system for separating particles from a particle-laden airstream, said system comprising:

a portable frame having a longitudinal axis;

a large collection tank tiltably mounted on said portable frame for collecting and transporting particles separated from the airstream and for dumping the particles, said large collection tank including an inlet for receiving the airstream for an outlet for discharging the airstream;

a cyclone particle separator movably mounted on said portable frame with said separator having an airstream inlet and an airstream outlet and a lower portion for collecting particles from the airstream;

flexible conduit means for connection at one of its ends to said airstream inlet of said particle separator and with its other end available for receiving a particle-laden airstream;

movable support means for supporting said particle separator and moving said particle separator between a first position adjacent said portable frame longitudinal axis and a second position located further laterally of said longitudinal axis;

said particle separator including particle release means mounted to said lower portion of said particle separator for releasing accumulated particles from said particle separator when said particle separator is in its second position to facilitate discharge of collected particles from said particle separator; and, blower means for urging an airstream to pass sequentially through said flexible conduit, and through said airstream inlet, through said particle separator and to exit through said airstream outlet when said particle separator is in its second position.

40. A portable vacuum cleaning system for separating particles from a particle-laden airstream comprising:

a portable frame having a longitudinal axis;

a large collection tank tiltably mounted to said frame and having an airstream inlet and an airstream outlet;

a cyclone particle separator mounted on said portable frame with said separator having a lower portion, an airstream inlet and an airstream outlet;

a filter bag house supported by said portable frame for housing a plurality of filter bags and having an airstream inlet and an airstream outlet;

blower means for urging an airstream to pass sequentially through said airstream inlet, through said particle separator and to exit through said particle separator airstream outlet and to pass through said large collection chamber and to pass through said filter bag house and said filter bags;

the improvement therein comprising: movable support means for supporting said cyclone separator and moving said cyclone separator between a first position adjacent said portable frame longitudinal axis and a second position located further laterally of said longitudinal axis; and said cyclone separator including a lower accumulation chamber having a particle release means mounted to said lower portion for releasing accumulated particles from said particle separator when said particle separator is in said second position;

whereby the cyclone separator can be moved by its support means to an extended position away from the frame to facilitate the discharge of particles collected in the lower portion of the cyclone separator.

41. A portable vacuum cleaning system for separating particles from a particle-laden airstream, said system comprising:

a portable frame having a longitudinal axis;

a large collection tank mounted on said portable frame for collecting and transporting particles separated from the airstream, said large collection tank including an inlet for receiving the airstream and an outlet for discharging the airstream;

a filter bag house mounted on said portable frame with a plurality of filter bags mounted therein;

a cyclone particle separator mounted on said portable frame with said separator having an airstream inlet and airstream outlet and a lower portion for collecting particles from the airstream;

flexible conduit means for connection at one of its ends to said airstream inlet of said particle separator and with its other end available for receiving particles about the system;

blower means, and conduit means in communication with said blower means for urging an airstream to pass sequentially through said air stream inlet, through said particle separator and to exit through said airstream outlet, and also through said flexible conduit means, and through said bag house;

the improvement therein comprising: movable support means for supporting said particle separator and moving said particle separator between a first position adjacent said portable frame longitudinal axis and a second position located farther laterally of said longitudinal axis to facilitate discharge of collected particles from said particle separator; and said particle separator including particle release means mounted to said lower portion of said particle separator for releasing accumulated particles from said particle separator when said separator is in said second position.

* * * * *